(No Model.)
C. J. ZEITINGER.
HANDLE FASTENING.
No. 364,330. Patented June 7, 1887.
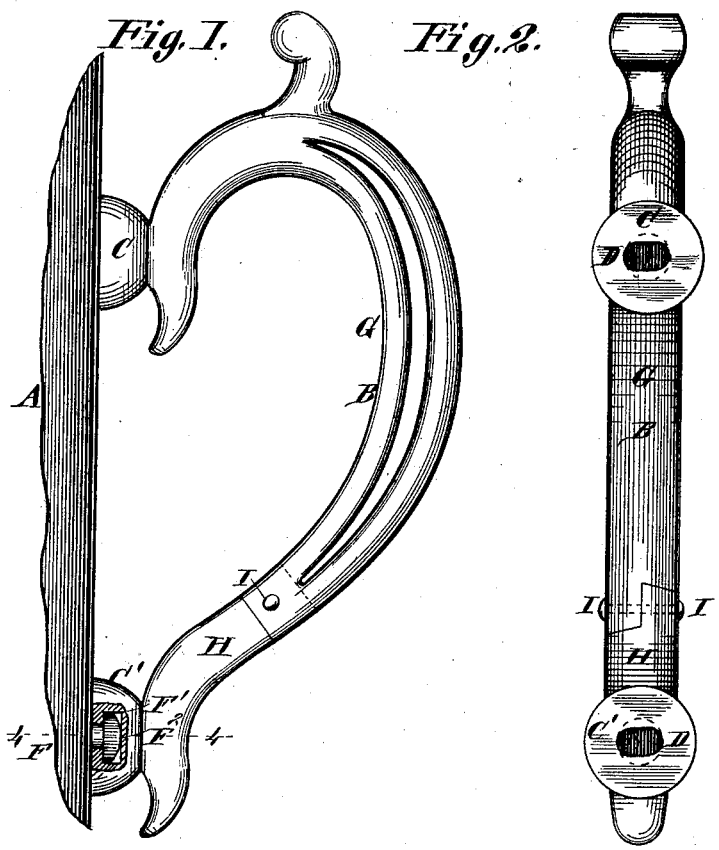
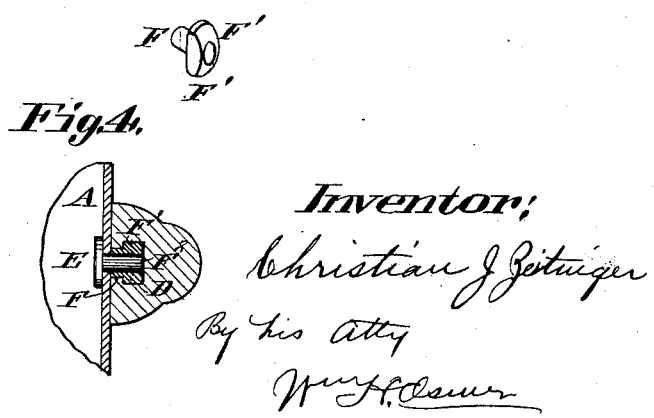
Attest:
Charles Pickles
G. N. Hinchman Jr.
Inventor:
Christian J. Zeitinger
By his Atty

UNITED STATES PATENT OFFICE.

CHRISTIAN J. ZEITINGER, OF GADS HILL, MISSOURI.

HANDLE-FASTENING.

SPECIFICATION forming part of Letters Patent No. 364,330, dated June 7, 1887.

Application filed February 18, 1886. Serial No. 192,466. (No model.)

*To all whom it may concern:*

Be it known that I, CHRISTIAN J. ZEITINGER, a citizen of the United States, residing at Gads Hill, in the county of Wayne and State of Missouri, have invented a new and useful Handle-Fastening, of which the following is a specification.

My invention is an improvement in handle-fastenings which are designed to be used in attaching or connecting handles to coffee or tea pots, bowls, pitchers, or any other domestic utensils, and are especially applicable to such articles having glazed, enameled, or earthen surfaces, and, in fact, any surface to which solder will not adhere.

The object of my invention is to provide means whereby metallic or other suitable handles may be quickly and firmly secured to any desired utensil.

To enable others skilled in the art to which my invention appertains to make and use the same, I will now proceed to describe its construction and operation, reference being had to the accompanying drawings, which form a part of this specification, and in which—

Figure 1 is a side view of a handle as it appears when secured to an article by my improved fastenings. Fig. 2 is an inside view of my improved handle in two parts—viz., upper and lower. Fig. 3 is a detail perspective view of rivet and washer. Fig. 4 is a view of handle and fastening in section on line 4 4 of Fig. 1.

Similar letters refer to similar parts throughout the several views.

A represents the side of a vessel through which the rivet E is inserted and capped by the washer F.

The handle B, consisting of the two parts G and H, is provided at its ends with bosses C and C', having oval-shaped openings D, chambered at the rear, as shown by dotted lines.

The rivet E and washer F are secured to the vessel A, as shown in Figs. 1 and 4.

The handle B, constructed in the two parts G and H, as shown in Fig. 2, is attached by connecting the said parts to the vessel A at right angles and reversing to their normal position, where the parts G and H are fastened together, and the handle B secured in position by one or more rivets, I, passed through the handle, as shown in Fig. 2; or, if desired, the handle B may be in two longitudinal halves, as shown in Fig. 5, in which instance the two longitudinal parts G and H are attached to the pot by sliding the oval-shaped slots or openings D, having circular chambers, over and upon the head or washer F of the rivet E, thus joining the longitudinal parts G and H, and securing them in place and upon the pot by passing the rivets I through the upper and lower parts of the handle B, or at such intervals as may be required.

If desired, the rivet E and washer F can be finished and glazed or enameled with the vessel A, as the handle B can be attached afterward, thus obviating the use of rivets as formerly required to secure handles to glazed-surfaced utensils, which rendered them defective and often leaky after short usage by reason of the rivet-holes. Again, by the use of my improved handles, handles and vessels may be packed separately for shipment, thus using smaller packages, and saving in the cost of transportation, and when unpacked the handles may be readily attached to their respective utensils.

It will also be observed in Fig. 2 that the parts G and H are formed with overlaps at their inner ends adapted to be riveted together.

Having thus described my invention, what I claim is—

1. A detachable handle for tea-pots or other like utensils, comprising the two parts G H, formed at their outer ends with hollow bosses C C', having oval openings D, and at their inner ends with overlaps adapted to be riveted together, the rivets E, and washers F.

2. The combination of a tea-pot and a detachable handle therefor comprising the two parts G H, formed at their outer ends with hollow bosses C C', having oval openings D, and at their inner ends with overlaps adapted to be riveted together, the rivets E, and washers F.

CHRISTIAN J. ZEITINGER.

In presence of—
ANTHONY ZEITINGER,
J. F. BERRYMAN.